(12) United States Patent
Valentin et al.

(10) Patent No.: US 10,554,957 B2
(45) Date of Patent: Feb. 4, 2020

(54) LEARNING-BASED MATCHING FOR ACTIVE STEREO SYSTEMS

(71) Applicant: Google LLC, Mountain View, CA (US)

(72) Inventors: Julien Pascal Christophe Valentin, Mountain View, CA (US); Sean Ryan Fanello, Mountain View, CA (US); Adarsh Prakash Murthy Kowdle, San Francisco, CA (US); Christoph Rhemann, Mountain View, CA (US); Vladimir Tankovich, Renton, WA (US); Philip L. Davidson, Arlington, MA (US); Shahram Izadi, Tiburon, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/996,880

(22) Filed: Jun. 4, 2018

(65) Prior Publication Data
US 2018/0352213 A1    Dec. 6, 2018

Related U.S. Application Data

(60) Provisional application No. 62/514,911, filed on Jun. 4, 2017.

(51) Int. Cl.
*G06K 9/64* (2006.01)
*H04N 13/271* (2018.01)
(Continued)

(52) U.S. Cl.
CPC ......... *H04N 13/271* (2018.05); *G06K 9/6268* (2013.01); *G06T 7/593* (2017.01);
(Continued)

(58) Field of Classification Search
CPC .......... G06T 7/593; G06T 2207/20081; G06K 9/6268; H04N 13/128; H04N 19/597; H04N 13/271; H04N 2013/0081
See application file for complete search history.

(56) References Cited

U.S. PATENT DOCUMENTS 5,654,771 A * 8/1997 Tekalp ................... H04N 19/54
                                                    348/699
8,090,194 B2    1/2012 Golrdon et al.
(Continued)

OTHER PUBLICATIONS

International Search Report and Written Opinion dated Nov. 12, 2018 for corresponding International Application No. PCT/US2018/044096, 18 pages.
(Continued)

*Primary Examiner* — Philip P. Dang

(57) ABSTRACT

A first and second image of a scene are captured. Each of a plurality of pixels in the first image is associated with a disparity value. An image patch associated with each of the plurality of pixels of the first image and the second image is mapped into a binary vector. Thus, values of pixels in an image are mapped to a binary space using a function that preserves characteristics of values of the pixels. The difference between the binary vector associated with each of the plurality of pixels of the first image and its corresponding binary vector in the second image designated by the disparity value associated with each of the plurality of pixels of the first image is determined. Based on the determined difference between binary vectors, correspondence between the plurality of pixels of the first image and the second image is established.

20 Claims, 4 Drawing Sheets

(51) Int. Cl.
| | |
|---|---|
| *H04N 19/597* | (2014.01) |
| *H04N 13/128* | (2018.01) |
| *G06K 9/62* | (2006.01) |
| *G06T 7/593* | (2017.01) |
| *H04N 13/00* | (2018.01) |

(52) U.S. Cl.
CPC ......... *H04N 13/128* (2018.05); *H04N 19/597* (2014.11); *G06T 2207/20081* (2013.01); *H04N 2013/0081* (2013.01)

(56) References Cited

U.S. PATENT DOCUMENTS

| | | | |
|---|---|---|---|
| 8,150,142 B2 | 4/2012 | Freedman et al. | |
| 8,218,631 B2* | 7/2012 | Marpe | H04N 19/176 375/240.01 |
| 8,867,790 B2* | 10/2014 | Nanri | G01C 21/3602 382/103 |
| 9,152,882 B2* | 10/2015 | Hedau | G06K 9/6227 |
| 9,269,043 B2* | 2/2016 | Nugent | G06N 3/049 |
| 9,324,316 B2* | 4/2016 | Mitsui | G10L 13/027 |
| 9,361,722 B2* | 6/2016 | Latorre-Martinez | G10L 21/10 |
| 9,392,262 B2* | 7/2016 | Dal Mutto | H04N 13/254 |
| 9,558,738 B2* | 1/2017 | Bocchieri | G10L 15/063 |
| 9,582,889 B2* | 2/2017 | Shpunt | G01B 11/22 |
| 9,674,505 B2* | 6/2017 | Wu | H04N 13/243 |
| 9,756,264 B2* | 9/2017 | Hoelter | H04N 5/33 |
| 9,805,294 B2* | 10/2017 | Liu | G06T 5/00 |
| 9,826,216 B1* | 11/2017 | Hazeghi | G02B 27/0075 |
| 9,930,363 B2* | 3/2018 | Rusanovskyy | H04N 19/597 |
| 9,959,657 B2* | 5/2018 | Latorre-Martinez | G10L 21/10 |
| 10,013,765 B2* | 7/2018 | Ramalingam | G06T 7/33 |
| 10,070,042 B2* | 9/2018 | Nikkanen | H04N 5/23212 |
| 10,083,233 B2* | 9/2018 | Kontschieder | G06F 16/783 |
| 10,194,089 B2* | 1/2019 | Nash | H04N 5/23241 |
| 10,234,287 B2* | 3/2019 | Siercks | G01C 15/002 |
| 10,402,704 B1* | 9/2019 | Wu | G06K 9/6212 |
| 2014/0063188 A1* | 3/2014 | Smirnov | G06T 7/593 348/43 |
| 2015/0302317 A1* | 10/2015 | Norouzi | G06N 20/00 706/12 |
| 2016/0337632 A1* | 11/2016 | Vandame | H04N 5/2254 |
| 2017/0347044 A1* | 11/2017 | Douady-Pleven | H04N 5/247 |
| 2018/0174035 A1* | 6/2018 | Nugent | G06N 3/0635 |
| 2018/0307310 A1* | 10/2018 | McCombe | H04N 13/239 |
| 2018/0352178 A1* | 12/2018 | Kato | H04N 5/357 |
| 2019/0066271 A1* | 2/2019 | Kanbara | H04N 5/243 |

OTHER PUBLICATIONS

Fanello, Sean Ryan et al., "UltraStereo: Efficient Learning-Based Matching for Active Stereo Systems", IEEE Computer Society Conference on Computer Vision and Pattern Recognition, Jul. 21, 2017; pp. 6535-6544.
Lim, Jaeseung et al., "A Census Transform-Based Robust Stereo Matching Under Radiometric Changes", 2016 Asia-Pacific Signal and Information Processing Association Annual Summit and Conference, Dec. 13, 2016; pp. 1-4.
Maturana, Daniel et al., "Face Recognition with Decision Tree-Based Local Binary Patterns", Medical Image Computing and Computer-Assisted Intervention—MICCAI 2015: 18th International Conference; Munich, Germany; Oct. 5-9, 2015; pp. 3-6.
Mun, Ji-Hun et al. "Quality Preserving Depth Estimation in Sequential Stereo Images", 2016 Asia-Pacific Signal and Information Processing Association Annual Summit and Conference, Dec. 13, 2016; pp. 1-4.
Schauwecher, Konstantin et al. "A New Feature Detector and Stereo-Performance Sparse Stereo Matching", 2012 IEEE/RSJ International Conference on Intelligent Robots and Systems (IROS), Oct. 7, 2012, pp. 5171-5176.

Wang et al., "The Global Patch Collider", IEEE Conference on Computer Vision and Pattern Recognition (CVPR), Jun. 2016, 9 pages.
Yoon et al., "Locally Adaptive Support-Weight Approach for Visual Correspondence Search", IEEE Conference on Computer Vision and Pattern Recognition (CVPR), Jun. 2005, 8 pages.
Zabih et al., "Non-parametric Local Transforms for Computing Visual Correspondence", European Conference on Computer Vision (ECCV), Springer, 1994, 8 pages.
Zbontar et al., "Computing the Stereo Matching Cost with a Convolutional Neural Network", IEEE Conference on Computer Vision and Pattern Recognition (CVPR), Jun. 2015, 8 pages.
GOM, ATOS—Industrial 3D Scanning Technology, <http://www.gom.com/metrology-systems/atos.html>, Accessed Jun. 22, 2018, 5 pages.
Intel RealSense Developer Kit (R200), <http://software.intel.com/en-us/realsense/previous>, Accessed Mar. 8, 2018, 7 pages.
ZCam—Wikipedia, <http://en.wikipedia.org/wiki/ZCam>, Accessed Mar. 8, 2018, 4 pages.
Barnes et al., "PatchMatch: A Randomized Correspondence Algorithm for Structural Image Editing", ACM Transactions on Graphics (Proc. SIGGRAPH), Aug. 2009, 10 pages.
Besse et al., "PMBP:PatchMatch Belief Propagation for Correspondence Field Estimation", International Journal of Computer Vision, vol. 110, Issue 1, Oct. 2014, 1 page.
Bhandari et al., "Resolving Multi-path Interference in Time-of-Flight Imaging via Modulation Frequency Diversity and Sparse Regularization", Optics Letters, vol. 39, Issue 6, Apr. 2014, 11 pages.
Bleyer et al., "Simple but Effective Tree Structures for Dynamic Programming-Based Stereo Matching", International Conference on Computer Vision Theory and Applications (VISAPP), Jan. 2008, 8 pages.
Bleyer et al., PatchMatch Stereo—Stereo Matching with Slanted Support Windows, British Machine Vision Conference (BMVC), Sep. 2011, 1 page.
Butler et al., "Shake'n'Sense: Reducing Interference for Overlapping Structured Light Depth Cameras", ACM Conference on Human Factors in Computing Systems (CHI), May 2012, 4 pages.
Criminisi et al., "Decision Forests for Computer Vision and Medical Image Analysis", Advances in Computer Vision and Pattern Recognition, Springer, ISSN 2191-6586, 2013, 4 pages.
Dou et al., "Fusion4D: Real-time Performance Capture of Challenging Scenes", ACM Conference and Exhibition on Computer Graphics and Interactive Techniques (SIGGRAPH), Jul. 2016, 13 pages.
Eigen et al., "Depth Map Prediction from a Single Image using a Multi-Scale Deep Network", Conference on Neural Information Processing Systems (NIPS), Dec. 2014, 9 pages.
Elkhalili et al., "A 64×8 Pixel 3-D CMOS Time of Flight Image Sensor for Car Safety Applications", IEEE European Solid-State Circuits Conference (ESSCIRC), Sep. 2006, 4 pages.
Fanello et al., "3D Estimation and Fully Automated Learning of Eye-Hand Coordination in Humanoid Robots", IEEE—RAS International Conference on Humanoid Robots, Nov. 2014, 8 pages.
Fanello et al., "Learning to be a Depth Camera for Close-Range Human Capture and Interaction", ACM Transactions on Graphics (TOG), vol. 33, Issue 4, Jul. 2014, 11 pages.
Fanello et al., "Filter Forests for Learning Data-Dependent Convolutional Kernels", IEEE Conference on Computer Vision and Pattern Recognition (ICPR), Jun. 2014, 8 pages.
Fanello et al., "HyperDepth: Learning Depth from Structured Light Without Matching", IEEE Conference on Computer Vision and Pattern Recognition (CVPR), Jun. 2016, 10 pages.
Felzenszwalb et al., "Efficient Belief Propagation for Early Vision", International Journal of Computer Vision, vol. 70, Issue 1, Oct. 2006, 8 pages.
Foi et al., "Practical Poissonian-Gaussian Noise Modeling and Fitting for Single-Image Raw-Data", IEEE Transactions on Image Processing, Oct. 2017, 18 pages.
Freedman et al., "SRA: Fast Removal of General Multipath for ToF Sensor", http://arXiv.org, arXiv:1403.5919v1, Computer Vision and Pattern Recognition (cs.CV), Mar. 2014, 15 pages.

(56) References Cited

OTHER PUBLICATIONS

Geng, "Structured-Light 3D Surface Imaging: A Tutorial", OSA Publishing, Advances in Optics and Photonics, vol. 3 Issue 2, Mar. 31, 2011, 33 pages.
Hartley et al., "Multiple View Geometry in Computer Vision", Second Edition, Cambridge University Press, ISBN-13 978-0-521-54051-3, 2004,4 pages.
He et al., "Guided Image Filtering", IEEE Transactions on Pattern Analysis and Machine Intelligence, vol. 35, Issue 6, Jun. 2013, 13 pages.
Heise et al., "Fast Dense Stereo Correspondences by Binary Locality Sensitive Flashing", IEEE International Conference on Robotics and Automation (ICRA), May 2015, 6 pages.
Hirschmuller, "Stereo Processing by Semiglobal Matching and Mutual Information", IEEE Transactions on Pattern Analysis and Machine Intelligence, vol. 30, Issue 2, Feb. 2008, 14 pages.
Hirschmuler et al., "Evaluation of Stereo Matching Costs on Images with Radiometric Differences", IEEE Transactions on Pattern Analysis and Machine Intelligence, vol. 31, Issue 9, Sep. 2009, 17 pages.
Izadi et al., "KinectFusion: Real-time 3D Reconstruction and Interaction Using a Moving Depth Camera", ACM Symposium on User Interface Software and Technology (UIST), Oct. 2011, 10 pages.
Jimenez et al., "Modelling and Correction of Multipath Interference in Time of Flight Cameras", IEEE Conference on Computer Vision and Pattern Recognition (CVPR), Jun. 2012, 8 pages.
Ju et al., "Constant Time Stereo Matching", IEEE International Machine Vision and Image Processing Conference, Sep. 2009, 5 pages.
Konolige, "Projected Texture Stereo", IEEE International Conference on Robotics and Automation, May 2010, 8 pages.
Krahenbuhl, "Efficient Inference in Fully Connected CRFs with Gaussian Edge Potentials", http://arXiv.org, arXiv:1210.5644v1, cs.CV, Oct. 2012, 9 pages.
Li et al., "SPM-BP: Sped-up PatchMatch Belief Propagation for Continuous MRFs", IEEE International Conference on Computer Vision (ICCV), Dec. 2015, 9 pages.
Lu et al., "Cross-Based Local Multipoint Filtering", IEEE Conference on Computer Vision and Pattern Recognition (CVPR), Jun. 2012, 8 pages.
Lu et al., "PatchMatch Filter: Efficient Edge-Aware Filtering Meets Randomized Search for Fast Correspondence Field Estimation", IEEE Conference on Computer Vision and Pattern Recognition (CVPR), Jun. 2013, 8 pages.
McIlroy et al., "Kinectrack: 3D Pose Estimation Using a Projected Dense Dot Pattern", IEEE Transactions on Visualization and Computer Graphics, vol. 20, Issue 6, Jun. 2014, 13 pages.
Naik et al., "A Light Transport Model for Mitigating Multipath Interference in Time-of-flight Sensors", IEEE Conference on Computer Vision and Pattern Recognition (CVPR), Jun. 2015, 9 pages.
Nishihara, "PRISM: A Practical Mealtime Imaging Stereo Matcher", SPIE 0449, Intelligent Robots: 3rd International Conference on Robot Vision and Sensory Controls, Feb. 16, 1984, 36 pages.
Orts-Escolano et al., "Floloportation: Virtual 3D Teleportation in Real-time", ACM User Interface Software and Technology Symposium (UIST), Oct. 2016, 14 pages.
Paris et al., "Bilateral Filtering: Theory and Applications" Foundations and Trends in Computer Graphics and Vision, vol. 4, Issue 1, 2008, 75 pages.
Pradeep et al., "MonoFusion: Real-time 3D Reconstruction of Small Scenes with a Single Web Camera", IEEE International Symposium on Mixed and Augmented Reality (ISMAR), Oct. 2013, 6 pages.
Rhemann et al., "Fast Cost-Volume Filtering for Visual Correspondence and Beyond", IEEE Transactions on Pattern Analysis and Machine Intelligence, vol. 35, Issue 2, Feb. 2013, 8 pages.
Salvi et al., "A State of the art in Structured Light Patterns for Surface Profilometry", Journal on Pattern Recognition, vol. 43, Issue 8, Aug. 2010, 15 pages.
Saxena et al., "Make3D: Learning 3D Scene Structure from a Single Still Image", IEEE Transactions on Pattern Analysis and Machine Intelligence, vol. 31, Issue 5, May 2009, 16 pages.
Scharstein et al., "A Taxonomy and Evaluation of Dense Two-Frame Stereo Correspondence Algorithms", Proceedings IEEE Workshop on Stereo and Multi-Baseline Vision (SMBV), Dec. 2001, 35 pages.
Shotton et al., "Real-Time Human Pose Recognition in Parts from Single Depth Images", IEEE Conference on Computer Vision and Pattern Recognition (CVPR), Jun. 2011, 8 pages.
Shotton et al., "Scene Coordinate Regression Forests for Camera Relocalization in RGB-D Images", IEEE Conference on Computer Vision and Pattern Recognition (CVPR), Jun. 2013, 8 pages.
Stuhmer et al., "Model-Based Tracking at 300Hz using Raw Time-of-Flight Observations", IEEE International Conference on Computer Vision (ICCV), Dec. 2015, 9 pages.
Szeliski, "Computer Vision: Algorithms and Applications", Springer, 2010, 979 pages.
Tomasi et al., "Bilateral Filtering for Gray and Color Images", Sixth International Conference on Computer Vision (IEEE Cat. No. 98CH36271), Jan. 1998, 8 pages.
Valentin et al., "SemanticPaint: Interactive 3D Labeling and Learning at your Fingertips", ACM Transactions on Graphics (TOG), vol. 34, Issue 5, Oct. 2015, 16 pages.
Vuylsteke et al., "Range Image Acquisition with a Single Binary-Encoded Light Pattern", IEEE Transactions on Pattern Analysis and Machine Intelligence, vol. 12, Issue 2, Feb. 1990, 17 pages.

* cited by examiner

LEARNING-BASED MATCHING FOR ACTIVE STEREO SYSTEMS

CROSS REFERENCE TO RELATED APPLICATIONS

The present application claims priority to the following application, the entirety of which is incorporated by reference herein:

U.S. Patent Application Ser. No. 62/514,911, entitled "ULTRASTEREO: EFFICIENT LEARNING-BASED MATCHING FOR ACTIVE STEREO SYSTEMS" and filed on Jun. 4, 2017.

BACKGROUND

In head mounted display (HMD) and other imaging systems, depth imaging may be obtained by correlating left and right stereoscopic images to match pixels between the stereoscopic images. The pixels may be matched by determining which pixels are the most similar between the left and right images. Pixels correlated between the left and right stereoscopic images may be used to determine depth information. For example, a disparity between the location of the pixel in the left image and the location of the corresponding pixel in the right image may be used to calculate the depth information using binocular disparity techniques. An image may be produced that contains depth information for a scene, such as information related to how deep or how far away objects in the scene are in relation to a camera's viewpoint. Such images are useful in perceptual computing for applications such as gesture tracking and object recognition, for example.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Various depth sensing technologies are used in computer vision tasks including human capture, 3D scene reconstruction, object recognition, and robotics. These depth sensing technologies include gated or continuous wave time-of-flight (ToF), triangulation-based spatial, or temporal structured light (SL) systems. Such techniques are computationally intensive and may not work with active stereo, in which a pattern is projected on a scene. In such pattern dominant situations, it is often difficult to segment objects in a scene based on color.

Since depth imaging may be used in a wide variety of applications, it may be desirable to make depth imaging more accurate and reliable. However, efficient estimation of depth from pairs of stereo images is computationally expensive and one of the core problems in computer vision. Multiple memory accesses are often required to retrieve stored image patches from memory. The algorithms are therefore both memory and computationally bound. The computational complexity therefore increases in proportion to the sample size, e.g., the number of pixels in an image.

The efficiency of stereo matching techniques can be improved using active stereo (i.e. stereo matching where scene texture is augmented by an active light projector), largely due to improved robustness when compared to time of flight or traditional structured light techniques. FIGS. 1-4 describe systems and methods for an unsupervised optimization scheme that learns features that are discriminative for estimating correspondences in infrared images. This disclosure provides techniques that optimize a series of sparse hyperplanes that are used at test time to remap all the image patches into a compact binary representation. For example, in some embodiments, a method of depth estimation from pairs of stereo images includes capturing, at a pair of cameras, a first image and a second image of a scene. The first image and the second image form a stereo pair and each include a plurality of pixels. Further each of the plurality of pixels in the first image is associated with a disparity value. An image patch associated with each of the plurality of pixels of the first image and the second image is mapped into a binary vector. The difference between the binary vector associated with each of the plurality of pixels of the first image and its corresponding binary vector in the second image designated by the disparity value associated with each of the plurality of pixels of the first image is used to determined correspondence between the plurality of pixels of the first image and the second image based on the determined difference between binary vectors.

Figure 1:
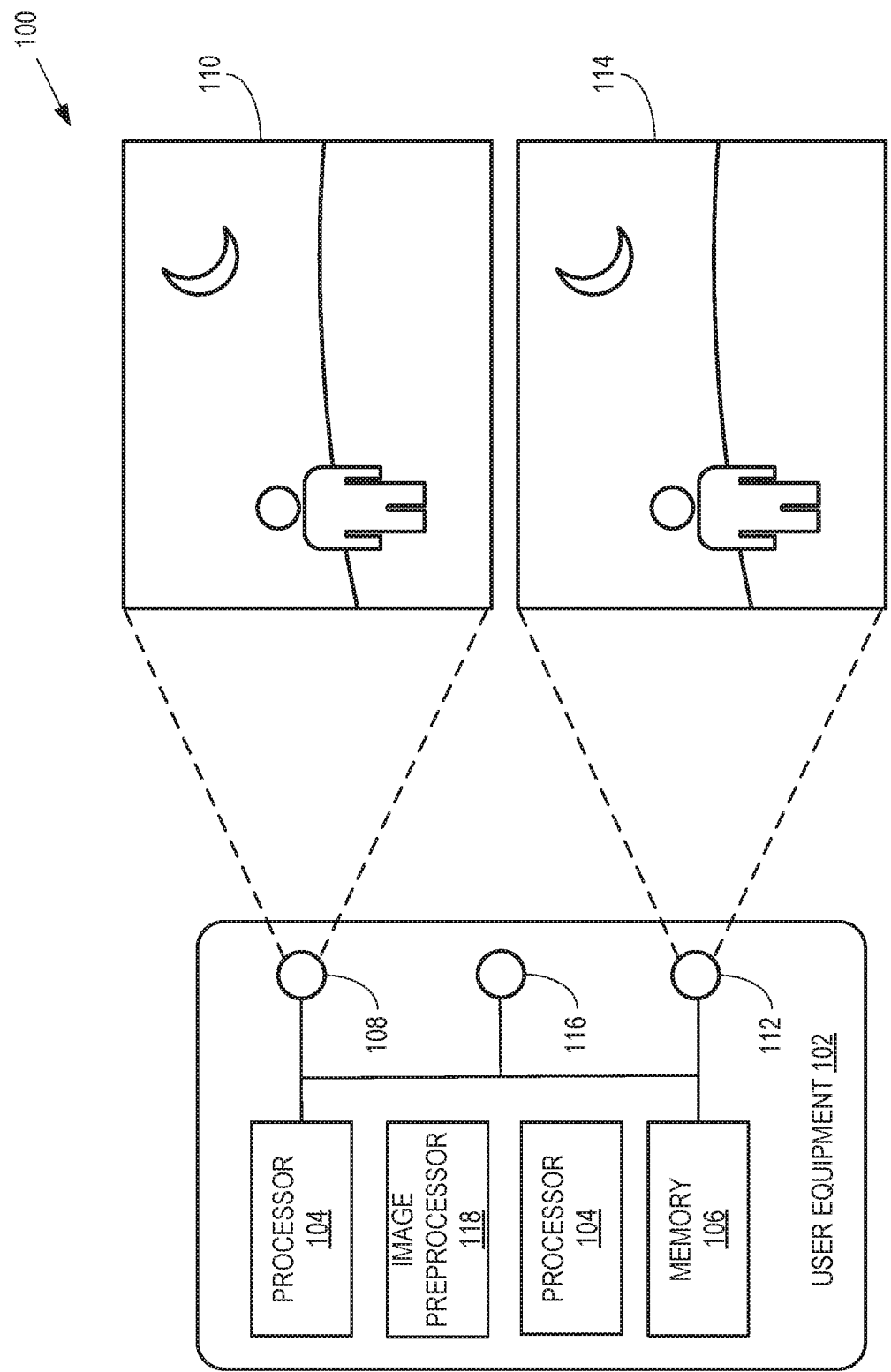
FIG. 1 is a block diagram of an active stereo imaging system configured to produce depth maps for AR/VR applications in accordance with at least one embodiment of the present disclosure.

FIG. 1 is a block diagram of an active stereo imaging system 100 that is configured to produce depth maps for AR/VR applications in accordance with at least one embodiment of the present disclosure. The active stereo imaging system 100 includes a user equipment 102 such as a tablet computer, computing-enabled cellular phone (e.g., a "smartphone"), a head-mounted display (HMD), a notebook computer, a personal digital assistant (PDA), a gaming system remote, a television remote, camera attachments with or without a screen, and the like. For ease of illustration, the active stereo imaging system 100 is generally described herein in the example context of a mobile device, such as a tablet computer or a smartphone; however, the active stereo imaging system 100 is not limited to these example implementations. For example, in other embodiments, the user equipment 102 can include another type of mobile device, such as an automobile, robot, remote-controlled drone or other airborne device, and the like. Some embodiments of the active stereo imaging system 100 include other devices that are configured to solve computer vision problems such as desktop computers, servers, and the like. Examples of computer vision problems that are addressed by the active stereo imaging system 100 include identification of stereo images, stereo matching, producing of depth maps, object classification, foreground/background segmentation, disparity estimation, image retrieval, feature approximation, background subtraction, and the like.

The user equipment 102 includes a processor 104 and a memory 106. The processor 104 may be used to execute instructions stored in the memory 106 and to store information in the memory 106 such as the results of the executed instructions. The user equipment 102 also implements one or more cameras that are used to acquire images. In the embodiment of FIG. 1, the active stereo imaging system 100 includes a left infrared (IR) camera 108 for capturing at least a first left image 110. The active stereo imaging system 100 further includes a right infrared camera 112 for capturing at least a first right image 114. The processor 104 is configured to operate on pixels representative of the images 110, 114 and the memory 106 is configured to store values of the pixels of the image 110, 114. Although the cameras 108, 112 are integral to the user equipment 102 in this embodiment, in some embodiments of the user equipment 102 (or other processing devices) operate on images acquired by external image acquisition devices. Additionally, although described here in the context of infrared cameras, those skilled in the art will recognize that any type of imaging camera may be used without departing from the scope of this disclosure.

Due to the physical separation between cameras 108, 112, each pixel in one image (e.g., left image 110) has a correspondence match in the other image (e.g., right image 114) of its stereo pair which lies on the same vertical line (e.g., along y-axis), but at a different horizontal position (e.g., along x-axis). This difference in image location of the same three-dimensional (3D) point when projected under perspective to two different cameras is referred to as "disparity" and is used to extract depth information. However, finding correspondence between pixels can be difficult in textureless regions of images (e.g., when looking at a white wall or a blue sky).

Thus, in various embodiments, the user equipment also includes an active light projector 116, such as a diffractive optical element (DOE) projector, that projects energy into a real-world environment surrounding the user equipment 102 to artificially produce texture in the scene. The active light projector 116 projects a pattern (e.g., a dot pattern, a striped pattern, or other pattern structure) into the surrounding environment to provide texture for the field of view of the cameras 108, 112 to be used for stereo matching. In some embodiments, the active light projector 116 operates in the infrared spectrum in conjunction with the cameras 108, 112. In other embodiments, the active light projector 116 operates in the visible spectrum. The active stereo vision configuration provided by the active light projector 116 and one or more cameras allow for disparity vector-based depth calculations to be performed for texture-less regions and removes the need to project a known structured light (SL) pattern.

Although the producing of depth maps for active stereo imaging system 100 is described here in the context of an active stereo vision configuration with an active light projector and two cameras, those skilled in the art will recognize that any type of projector capable of outputting a pattern into the scene and any number of sensors capable of receiving image data may be used without departing from the scope of this disclosure. For example, in other embodiments, depth estimation may also be performed in a structured light configuration with a single projector and a single camera.

When evaluating a single disparity hypothesis, traditional stereo algorithms compute the cost between image patches of size W by analyzing all the per pixel differences. The image data required for establishing matching between two image patches belongs to a lower dimensional space than the discriminative data contained in an actively illuminated pattern (e.g., a high frequency pattern such as one projected by the active light projector 116). Accordingly, to reduce computational overhead associated with finding correspondence across stereo images for disparity (and hence depth) estimation, the active stereo imaging system 100, in various embodiments, includes an image preprocessor module 118 and a matching module 120. Each of these modules represents hardware, software, or a combination thereof, configured to execute the operations as described herein. The image preprocessor module 118 performs stereo matching under active illumination by mapping image patches into a binary representation. The image preprocessor module 118 performs a convolution operation where the image is convolved, and after this convolution, each pixel will no longer be represented by its grayscale value, but instead will be represented by a binary vector. Subsequently, the matching module 120 conducts inference between the generated binary vectors to determine disparity and establish correspondence between pixels of the two images 110, 114 as further described herein.

Figure 2:
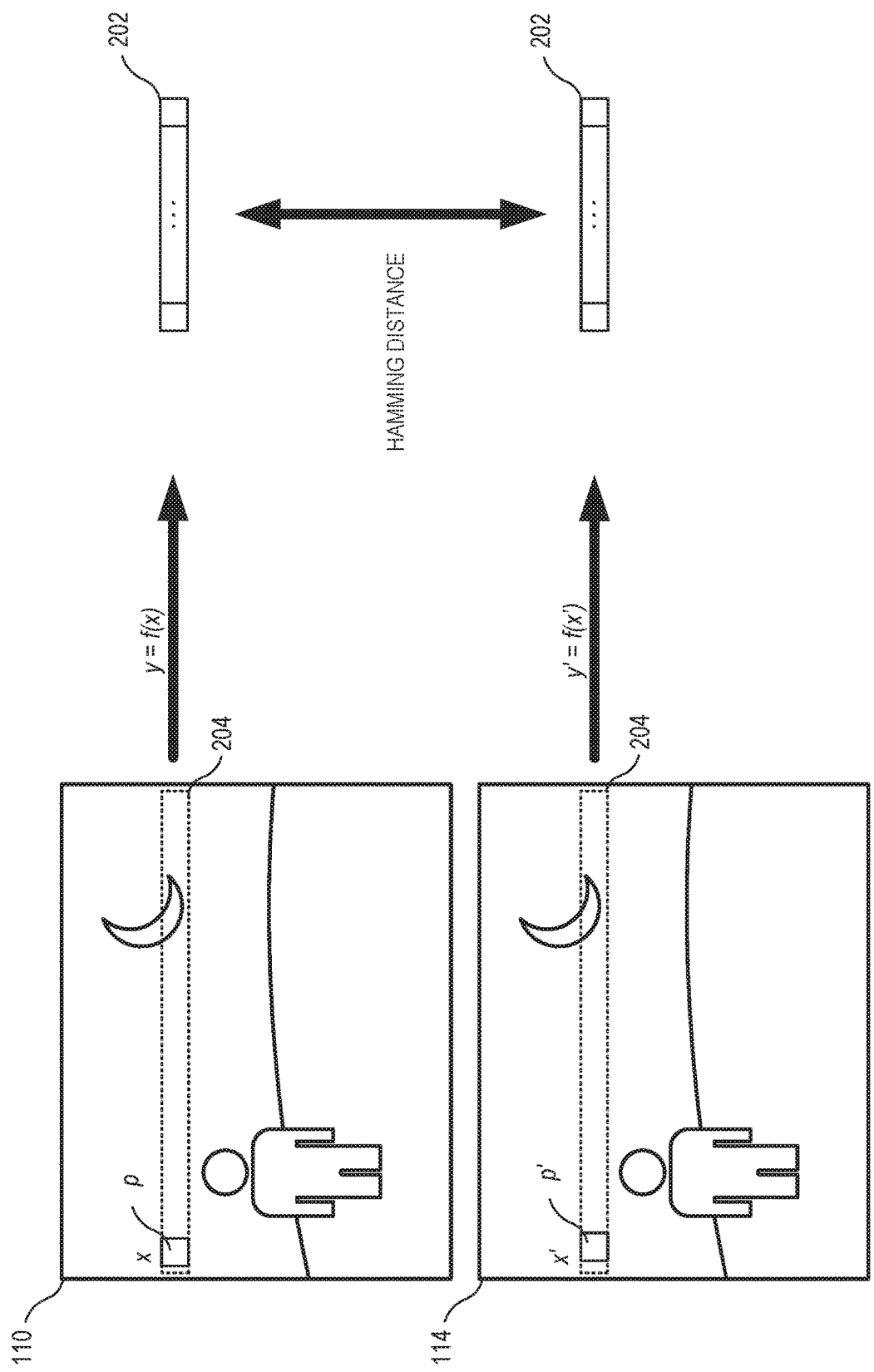
FIG. 2 is a diagram illustrating the operations of an image preprocessor to project image pixels to a binary representation in accordance with at least one embodiment of the present disclosure.

FIG. 2 is a diagram illustrating the operations of an image preprocessor, such as image preprocessor module 118 of FIG. 1, to project image pixels to a binary representation in accordance with at least one embodiment of the present disclosure. Each pixel $p=(x, y)$ in one image (e.g., the left image 110) has a correspondence match to its corresponding pixel p' in the other image of its stereo pair (e.g., right image 114) which lies on the same y-axis but at a different x-axis coordinate, $\hat{x}$. The difference $d=x-\hat{x}$ represents disparity and is inversely proportional to its depth $$Z = \frac{bf}{d},$$

where b is the baseline of the stereo system and $f$ is the focal length.

When determining correspondence for each pixel p, the image preprocessor module 118 determines an image patch around the pixel p and maps the image patch to a lower dimension of representation, thereby compressing the information within the image patch into a lower dimension representation. After this preprocessing, each pixel of the left image 110 and right image 114 is represented by a binary vector.

In some embodiments, the image preprocessor module 118 maps an image patch $x \in R^W$ (for each pixel of the images 110, 114) to a binary vector representation 202. The binary vector representation 202 is represented by $y \in \{0,1\}^b$ with $b \ll W$, where x is a vector containing all the pixels of a local image patch of window size W and b is the total number of binary splits (e.g., number of nodes in a binary decision tree). As shown, the image preprocessor module 118 uses a linear mapping function $f$ and transforms the image patch data from $R^W$ to its binary space $y \in \{0,1\}^b$ using equation (1):

$$y = f(x) = \text{sign}(x^T \cdot Z - \theta) \tag{1}$$

with $Z \in R^{W*b}$ and $\theta \in R^b$, where Z represents a mapping of hyperplanes z.

The image preprocessor module 118 only allows $k \ll W$ non-zero elements in each column of the mapping Z when computing matching cost (e.g., costs associated with computing stereo correspondence for generation of disparity maps), which removes the dependency on the window size W. That is, only k number of non-zero pixels are sampled per column of Z. The mapping function $f$ is data dependent for learning the subspace of patches generated by the active illuminator. To find a mapping Z that preserves the similarities of the input signal, the image preprocessor module 118 greedily computes, at each step, the best hyperplane z. In various embodiments, binary trees are used for numerous problems including pixel-wise labeling, regression tasks and correspondence search problems by using very simple and sparse split functions. Each node in a binary decision tree contains a set of learned split parameters $\delta=(z, \theta)$ which define a binary split of the data reaching that node. Based on the sign of $x^T \cdot Z - \theta$, samples are either routed to the left- or the right-child of a current node.

In some embodiments, to learn the split parameters of a tree, the image preprocessor module 118 relies on an unsupervised objective function, similar to the one used in density forests to avoid per-camera training. Given N unlabeled image patches $x_i$ (due to N number of pixels in the image) collected in arbitrary scenes, the image preprocessor module 118 approximates the underlying generative model of infrared patches. Starting from a root node that contains the set S of all the examples $x_i \in R^W$, the image preprocessor module 118 randomly samples multiple split parameters proposals $\delta$. To enforce sparsity and remove the dependency on W, only k elements in z are forced to be non-zero. For each candidate $\delta$, the image preprocessor module 118 evaluates the information gain based on equation (2):

$$I(\delta) = H(S) - \sum_{d \in L, R} \frac{|S_d(\delta)|}{|S|} H(S_d(\delta)) \quad (2)$$

where the set $S_d(\delta)$ is induced by the particular split function $\delta$. The entropy H(S) is assumed to be the continuous entropy of a W-dimensional Gaussian, which is represented by equation (3):

$$H(S_d) = \frac{1}{2} \log((2\pi e)^W |\Lambda(S_d)|) \quad (3)$$

where $\Lambda(S)$ is the W×W covariance matrix of the current set S and $|\cdot|$ indicates its determinant. The image preprocessor module 118 selects the candidate $\delta$ that maximizes equation (2) above for each node. The training procedure continues greedily until the end of the binary tree (e.g., which varies in depth across various embodiments) is reached. The image preprocessor module 118 exploit the binary splits induced by the $\delta$ parameters, and thus, does not storing any models in the leaves of the binary tree. At the end of the training phase, the image preprocessor module 118 concatenates the split parameters to form the linear mapping $Z=[z_1, \ldots, z_b]$ and $\theta=[\theta_1, \ldots, \theta_b]$.

In contrast to other binary mappings schemes, which sometimes used random sparse hyperplanes to perform binary mapping and require an output binary space to be of the same magnitude or larger than the patch size W, the binary mapping described herein reduce the dimensionality of the image patch data while retaining the discriminative information they carry for the task of establishing correspondences. Thus, by providing each pixel of the images 110, 114 as input signals to the binary decision tree, the image preprocessor module 118 traverses the binary decision tree and generates a binary vector 202.

In one embodiment, the total number of binary splits b, and therefore the number of nodes in the binary tree, is 32. Accordingly, in this embodiment, the binary tree has a height of 5 (i.e., $2^5$ nodes). The image preprocessor module 118 performs a sparse convolution (e.g., sparsely samples the image patch) by traversing the binary decision tree for each pixel in the images 110, 114 to construct the binary vector 202. The image preprocessor module 118 reduces the original image data of each pixel p (which includes spatial information necessary to disambiguate the pixel) down to a smaller, binary representation. In this example, the 32-bit binary vector encodes original image data to a binary value that can be stored in a single integer but still represents the original input signal.

Those skilled in the art will recognize that although described here in the context of compressing original image data to a 32-bit binary vector, binary vectors of differing sizes may be used without departing from the scope of this disclosure. Generally, there is a quality-speed tradeoff that results from changing the bit size of the binary vector. For example, in some embodiments, the speed of the image preprocessing may be increased by traversing a binary tree with 16 binary splits and generating a 16-bit binary vector at the cost of data quality. In other embodiments, the quality of the image preprocessing maybe increased by traversing a binary tree with 64 binary splits and generating a 64-bit binary vector at the cost of processing speed.

In this manner, the image preprocessor module 118 compresses the image data of a bigger neighborhood (i.e., image patch around the pixel p) into a smaller binary vector. Accordingly, regardless of how big or small the image patch $x \in R^W$ is, the image patch can be projected to a representation of a constant dimensionality, thereby removing the dependency of matching cost on the window size W.

After every patch in the left image 110 and right image 114 is projected to its binary vector representation 202, the matching module 120 determines how well a pixel in one image (e.g., left image 110) matches another pixel in the other image (e.g., right image 114) by computing the Hamming distance (e.g., distance between two strings of the same length) between their binary vector representations. To avoid having to compare the binary vector 202 on, for example, scanline 204 of the left image 110 to every other binary vector on the same scanline 204 in the right image 114, the matching module 120 performs a stereo matching framework as discussed below in more detail with regards to FIG. 3.

Figure 3:
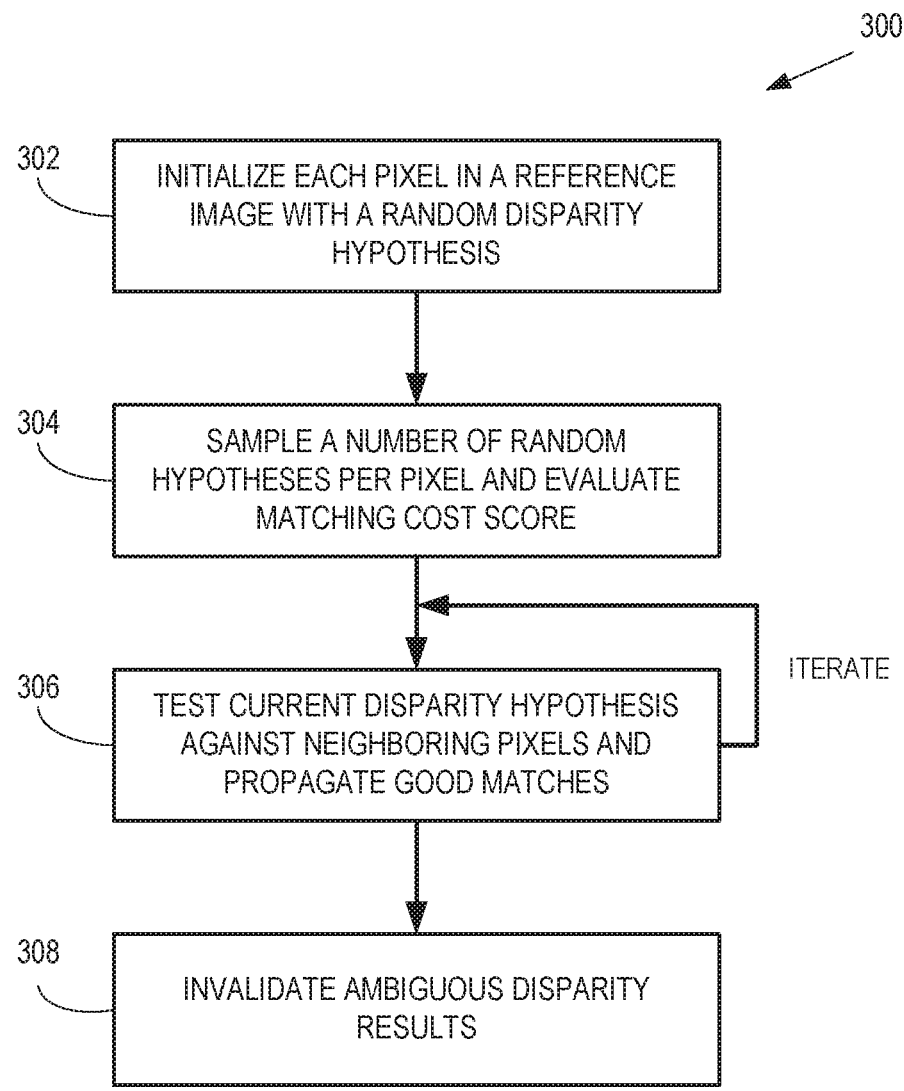
FIG. 3 is a flow diagram illustrating a method of stereo matching optimization based on random sampling in accordance with at least one embodiment of the present disclosure.

FIG. 3 is a flow diagram illustrating a method 300 of stereo matching optimization based on random sampling in accordance with at least one embodiment of the present disclosure. At block 302, the method 300 begins with an initialization process in which the matching module 120 initializes each pixel in a reference image (e.g., the left image 110) with a random disparity solution (i.e., a disparity hypothesis). Each pixel in the reference image stores a hypothesis of a disparity ($d = x - \hat{x}$) representing a shift in the x-axis coordinate of its corresponding pixel in the other image (e.g., the right image 114). At block 304, the matching module 120 samples a number of random disparities per pixel and their matching cost is evaluated in parallel, with the candidate with the lowest matching score being kept. If two bit vectors are different, then a bad matching cost score is returned; if two bit vectors are equivalent, then the best possible matching cost score is returned. Although most of the pixels give a bad matching cost score based on the random disparity hypothesis, a certain amount of disparities will have a good match by chance.

At block 306, the method 300 continues with a parallel propagation process in which coherence in the images 110, 114 is used to propagate those good matches of block 304 to its neighboring pixels. This includes each pixel testing its current disparity hypothesis against those of its immediately neighboring pixels and taking the lowest matching cost score as its own solution. Each pixel in the reference image checks its disparity hypothesis against the disparity of its neighboring pixels in parallel (e.g., performing the disparity hypothesis test for each pixel in the reference image simultaneously). By iterating block 306 a plurality of times, good disparity matches are propagated over the reference image and the process converges to a good solution and thereby generates a disparity (and therefore depth) map.

At block 308, the method 300 proceeds with an invalidation process in which disparities associated with large hamming distances in the generated disparity map are invalidated. Ideally, the disparity would be determined (and depth therefore estimated) for all pixels of the reference image. However, the presence of occlusions, saturation of the IR camera sensors, low signal-to-noise ratios, and the like can result in ambiguity in the disparity estimation. To limit these ambiguity errors, the invalidation process prunes unlikely matches (e.g., large hamming distances). In some embodiments, block 308 also includes a minimum region check to remove outliers.

Figure 4:
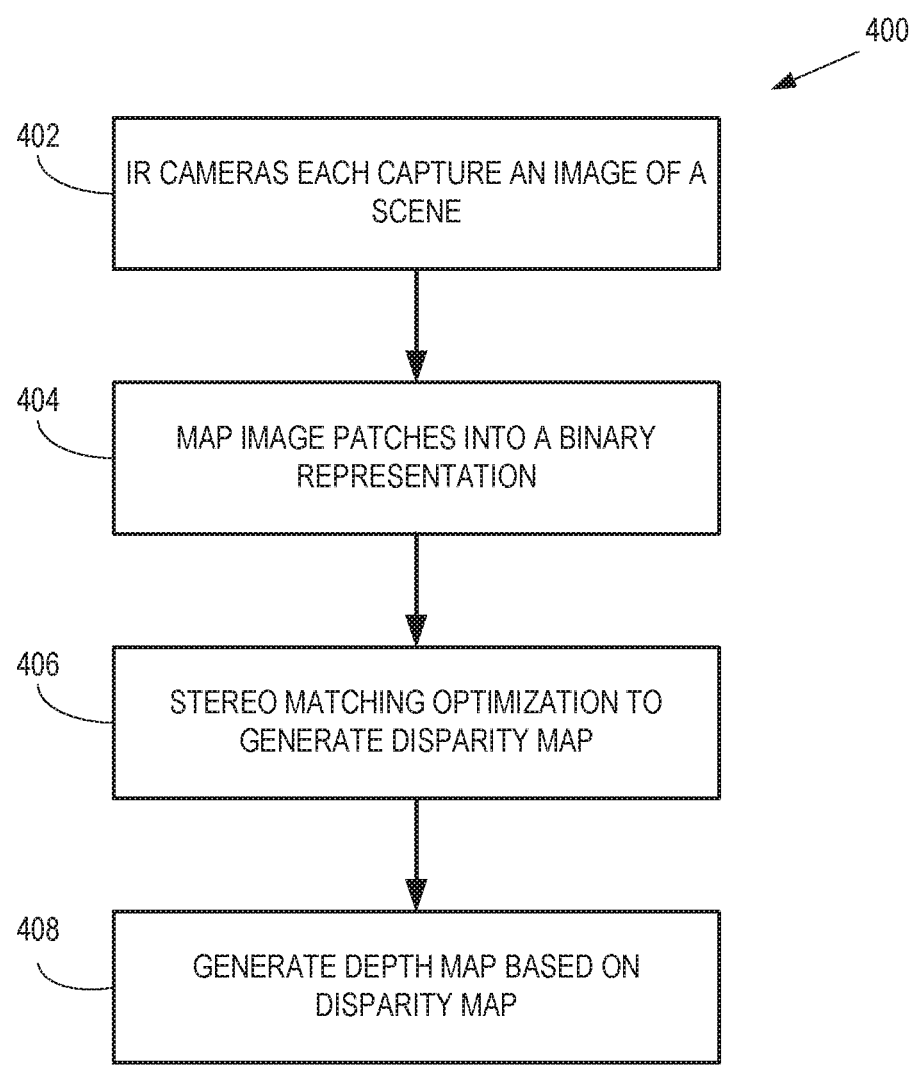
FIG. 4 is a flow diagram illustrating a method of estimating depth from pairs of stereo images in accordance with at least one embodiment of the present disclosure.

FIG. 4 is a flow diagram illustrating a method 400 of estimating depth from pairs of stereo images in accordance with at least one embodiment of the present disclosure. At block 402, the IR cameras 108, 112 of FIG. 1 each capture an image of a scene, forming a pair of stereo images. As illustrated in FIG. 1, the left IR camera 108 captures a left image 110 and the right IR camera 112 captures a right image 114. In this embodiment, the left image 110 is the reference image from which disparity is determined. In other embodiments, the right image 114 is the reference image.

At block 404, the image preprocessor module 118 performs stereo matching under active illumination by mapping image patches into a binary representation. In various embodiments, the image patch data for each pixel in the pair of stereo images is compressed into a binary vector. At block 406, after every image patch in the left and right images is projected into binary space, a stereo matching optimization such as described in more detail with respect to FIG. 3 is performed to generate a disparity map. At block 408, a depth map is generated based on the disparity map.

Since the stereo matching optimization and active stereo depth estimation described herein is performed in an unsupervised manner, the resulting hyperplanes can be transferred from one sensor to another without affecting precision. Additionally, the stereo problem is formulated to have a complexity that does not depend on the window size due to the binary vector representation and further does not depend on the size of the disparity space. The compact and efficient representation hat can generalize to different sensors and does not suffer from interferences when multiple active illuminators are present in a scene, thereby reducing the computational load associated with determining correspondence between pixels in stereo images.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
capturing a first image and a second image of a scene, wherein the first image and the second image form a stereo pair and each comprise a plurality of pixels, and further wherein each of the plurality of pixels in the first image is associated with a disparity value;
mapping an image patch associated with each of the plurality of pixels of the first image and the second image into a binary vector;
determining a difference between the binary vector associated with each of the plurality of pixels of the first image and its corresponding binary vector in the second image designated by the disparity value associated with each of the plurality of pixels of the first image; and determining correspondence between the plurality of pixels of the first image and the second image based on the determined difference between binary vectors.

2. The method of claim 1, further comprising:
initializing each of the plurality of pixels in the first image with a disparity hypothesis.

3. The method of claim 2, further comprising:
sampling a plurality of disparity hypotheses for each of the plurality of pixels in the first image; and
replacing the disparity value associated with each of the plurality of pixels of the first image based a lowest matching score of the plurality of disparity hypotheses.

4. The method of claim 3, wherein sampling a plurality of disparity hypotheses comprises comparing a matching cost associated with the disparity value of each pixel relative to a matching cost associated with the disparity value of one or more of its neighboring pixels.

5. The method of claim 1, wherein mapping the image patch associated with each of the plurality of pixels into a binary vector further comprises:
providing each pixel of the plurality of pixels of the first image and the second image as input signals to a binary decision tree, wherein the binary decision tree outputs a binary vector representation of its input signal.

6. The method of claim 5, further comprising:
sparsely sampling the image patch associated with the plurality of pixels of the first image and the second image by traversing the binary decision tree.

7. The method of claim 1, wherein determining the difference between the binary vector associated with each of the plurality of pixels of the first image and its corresponding binary vector in the second image further comprises:
computing a hamming distance between the binary vectors.

8. The method of claim 1, further comprising:
generating a disparity map based at least in part on the determined correspondence between the plurality of pixels of the first image and the second image.

9. An electronic device, comprising:
a pair of cameras to capture a first image and a second image of a scene, wherein the first image and the second image form a stereo pair and each comprise a plurality of pixels, and further wherein each of the plurality of pixels in the first image is associated with a disparity value; and
a processor configured to:
map an image patch associated with each of the plurality of pixels of the first image and the second image into a binary vector;
determine a difference between the binary vector associated with each of the plurality of pixels of the first image and its corresponding binary vector in the second image designated by the disparity value associated with each of the plurality of pixels of the first image; and
determine correspondence between the plurality of pixels of the first image and the second image based on the determined difference between binary vectors.

10. The electronic device of claim 9, wherein the processor is further configured to:
initialize each of the plurality of pixels in the first image with a disparity hypothesis.

11. The electronic device of claim 10, wherein the processor is further configured to:
sample a plurality of disparity hypotheses for each of the plurality of pixels in the first image; and
replace the disparity value associated with each of the plurality of pixels of the first image based a lowest matching score of the plurality of disparity hypotheses.

12. The electronic device of claim 11, wherein the processor is further configured to:
compare a matching cost associated with the disparity value of each pixel relative to a matching cost associated with the disparity value of one or more of its neighboring pixels.

13. The electronic device of claim 12, wherein the processor is further configured to:
propagate disparity values associated with matching costs lower than disparity values of neighboring pixels to one or more of its neighboring pixels.

14. The electronic device of claim 9, wherein the processor is further configured to:
provide each pixel of the plurality of pixels of the first image and the second image as input signals to a binary decision tree, wherein the binary decision tree outputs a binary vector representation of its input signal.

15. The electronic device of claim 14, wherein the processor is further configured to:
sparsely sample the image patch associated with the plurality of pixels of the first image and the second image by traversing the binary decision tree.

16. The electronic device of claim 9, wherein the processor is further configured to:
computing a hamming distance between the binary vectors.

17. The electronic device of claim 9, wherein the processor is further configured to:
generate a disparity map based at least in part on the determined correspondence between the plurality of pixels of the first image and the second image.

18. A method, comprising:
capturing, at a pair of cameras, a first image and a second image of a scene, wherein the first image and the second image form a stereo pair and each comprise a plurality of pixels, and further wherein each of the plurality of pixels in the first image is associated with a disparity value;
providing each pixel of the plurality of pixels of the first image and the second image as input signals to a binary decision tree; and
mapping an image patch associated with each of the plurality of pixels of the first image and the second image into a binary vector.

19. The method of claim 18, wherein mapping the image patch associated with each of the plurality of pixels of the first image and the second image into a binary vector reduces a dimensionality of image patch data while retaining discriminative data for establishing pixel correspondences.

20. The method of claim 18, wherein each node of the binary decision tree includes a set of learned parameters defining a binary split of data reaching that node.

* * * * *